United States Patent
Hiramitsu et al.

(10) Patent No.: US 7,193,334 B2
(45) Date of Patent: Mar. 20, 2007

(54) CONTROLLER FOR ELECTRONIC KEY SYSTEM

(75) Inventors: Takayuki Hiramitsu, Aichi (JP); Kiyokazu Ohtaki, Aichi (JP); Tomohiro Ohmura, Aichi (JP); Toshiki Akita, Aichi (JP); Teruya Tomiyasu, Toyota (JP); Noriyasu Onishi, Aichi-ken (JP); Manabu Mizutani, Ann Arbor, MI (US)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 28 days.

(21) Appl. No.: 11/128,838

(22) Filed: May 13, 2005

(65) Prior Publication Data

US 2005/0258686 A1 Nov. 24, 2005

(30) Foreign Application Priority Data

May 19, 2004 (JP) .............................. 2004-149525

(51) Int. Cl.
G05B 23/00 (2006.01)
G08B 29/00 (2006.01)
G06F 7/04 (2006.01)

(52) U.S. Cl. .................... 307/10.1; 307/10.2; 340/5.1; 340/5.24; 340/5.32; 340/5.61

(58) Field of Classification Search ............... 307/10.1, 307/10.2; 340/5.1, 5.24, 5.61, 5.32
See application file for complete search history.

(56) References Cited

U.S. PATENT DOCUMENTS

| 5,929,769 | A * | 7/1999 | Garnault ..................... 340/5.61 |
| 6,577,226 | B1 * | 6/2003 | Steiner ....................... 340/5.62 |
| 6,900,720 | B2 * | 5/2005 | Denison et al. .............. 340/5.9 |
| 6,958,682 | B2 * | 10/2005 | Lefaure .................. 340/426.36 |
| 7,042,332 | B2 * | 5/2006 | Takamura et al. ......... 340/5.24 |

FOREIGN PATENT DOCUMENTS

| EP | 1 201 514 A1 | 5/2002 |
| EP | 1 431 141 A2 | 6/2004 |
| EP | 1 394 006 A1 | 3/2005 |

* cited by examiner

*Primary Examiner*—Anatoly Vortman
*Assistant Examiner*—Michael Rutland-Wallis
(74) *Attorney, Agent, or Firm*—Crompton, Seager & Tufte, LLC (57) ABSTRACT

A controller for an electronic key system including a portable device and an engine. When the ID code of the portable device cannot be authenticated, the controller instructs the driver of the necessary operations. When a transmitter circuit is transmitting a request signal but a receiver circuit does not receive a signal including an ID code matching the ID code stored in a memory, an authentication ECU authenticates a transponder code of the portable device with a stored transponder code to enable the starting of the engine. The authentication ECU displays the necessary operations for performing transponder code authentication.

19 Claims, 5 Drawing Sheets

CONTROLLER FOR ELECTRONIC KEY SYSTEM

BACKGROUND OF THE INVENTION

The present invention relates to an electronic key system.

Japanese Laid-Open Patent Publication No. 2001-311333 describes an electronic key system that improves the security level and convenience for an automobile. The electronic key system is provided with a smart ignition function that enables the starting of the engine when an authentic key is carried into an automobile. An automobile employing the electronic key system has a rotary switch or push button to start the engine. When the starting of the engine is enabled, the driver turns a knob of the rotary switch to a start position or pushes the push button to start the engine.

The electronic key system includes an electronic key (portable device), which is held by the driver, and an engine start controller, which is installed in the automobile. The portable device stores an ID code that is unique to the portable device. The engine start controller stores an ID code (automobile ID code) that is identical to the ID code of the portable device. The engine start controller performs bidirectional communication with the portable device. When the two ID codes match, the engine start controller enables the starting of the engine.

More specifically, when the door of the automobile is open, the engine start controller transmits a request signal in a range covering most of the passenger compartment to perform bidirectional communication with the portable device. When a driver carrying the portable device enters the passenger compartment, the portable device transmits a signal including the ID code in response to the request signal. Then, the engine start controller determines whether the ID code of the portable device matches the automobile ID code. If the two ID codes match, the engine start controller validates the smart ignition function to enable the starting of the engine.

The smart ignition function enables the engine to be started just by carrying the portable device into the automobile and operating the engine start switch. That is, there is no need to perform a burdensome key operation to start the engine. This improves convenience. In addition, the portable device, which is difficult to duplicate compared to conventional mechanical keys, is necessary to enable the starting of the engine. This improves the security level of the automobile. Further, an electronic key system provided with the smart ignition function normally includes an immobilizer function. The engine cannot be started when the immobilizer function is valid. Predetermined operations are performed with the portable device to invalidate the immobilizer function and enable the starting of the engine.

The portable device, which is used for the smart ignition function, includes a battery functioning as a power supply. Thus, if battery drainage occurs, the portable device does not transmit the signal including the ID code in response to the request signal from the engine start controller even if the driver is carrying the portable device when entering the automobile. In this case, bidirectional communication is not performed between the portable device and the engine start controller. Thus, the smart ignition function remains invalid. In such a state, the driver must invalidate the immobilizer function by performing the predetermined operations with the portable device to start the engine.

The portable device includes a transponder. The transponder stores a transponder code that is unique to the transponder, or the portable device. The engine start controller stores a transponder code (automobile transponder code) that is identical to the transponder code of the portable device. When the two transponder codes match, the engine start controller invalidates the immobilizer function and enables the starting of the engine.

More specifically, if the engine start switch is a rotary switch, the driver inserts the portable device in an electronic key insertion slot located in the knob of the rotary switch. A key detection switch detects the insertion of the portable device. As a result, the engine start controller transmits a transponder activation signal to the vicinity of the engine start switch. In response to the transponder activation signal, the portable device transmits a signal including the transponder code. The engine start controller then determines whether the transponder code of the portable device matches the automobile transponder code. When the two transponder codes match, the engine start controller invalidates the immobilizer function and enables the starting of the engine. In a state in which the starting of the engine is enabled, that is, when the portable device is inserted in the electronic key insertion slot of the engine start switch, the driver turns the knob of the engine start switch to the start position in order to start the engine.

If the engine start switch is a push switch, the driver pushes the engine start switch when the smart ignition function is invalid. This transmits the transponder activation signal in the vicinity of the engine start switch. In a state in which the transponder activation signal is being transmitted in the vicinity of the engine start switch, the driver holds the portable device near the engine start switch. As a result, in response to the transponder activation signal, the portable device transmits a signal including the transponder code. The engine start controller then invalidates the immobilizer function and enables the starting of the engine. When the starting of the engine is enabled, the driver pushes the engine start switch again to start the engine.

As described above, when the smart ignition function is valid, the starting of the engine is enabled just by carrying the portable device into the automobile. When the smart ignition function is invalid due to a reason such as battery drainage, predetermined operations must be performed to enable the starting of the engine.

However, circumstances such as battery drainage does not often occur. Thus, even if the driver is aware that predetermined operations are necessary, the driver may forget the specific operations. Thus, there is a necessity to instruct the driver of the operations that must be performed when the smart ignition function is invalid.

SUMMARY OF THE INVENTION

It is an object of the present invention to provide a controller that instructs the driver of the operations that must be performed when the smart ignition function is invalid.

One aspect of the present invention provides a controller for an electronic key system including a portable device, carried by a user, and a control subject. The portable device incorporates a transponder and generates a signal including an ID code unique to the portable device and a signal including a transponder code unique to the transponder. The controller includes a first storage circuit for storing an ID code identical to the ID code of the portable device. A first transmitter circuit transmits a request signal that causes the portable device to transmit the signal including the ID code. A first receiver circuit receives the signal including the ID code that is transmitted from the portable device in response to the request signal. A first control unit determines whether the ID code stored in the first storage circuit matches the ID code of the portable device and performs a first control that enables activation of the control subject when the two ID codes match. A second storage circuit stores a transponder code identical to the transponder code of the portable device. A second transmitter circuit transmits a transponder activation signal that causes the portable device to transmit the signal including the transponder code. A second receiver circuit receives the signal including the transponder code that is transmitted from the portable device in response to the transponder activation signal. A second control unit determines whether the transponder code stored in the second storage circuit matches the transponder code of the portable device and performs a second control that enables activation of the control subject when the two transponder codes match. An instruction device instructs the user of an operation that must be performed to have the second control unit enable activation of the control subject when the first receiver circuit does not receive the signal including the ID code from the portable device even though the first transmitter circuit is transmitting the request signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electronic key system for an automobile according to a preferred embodiment of the present invention will now be described.

Figure 1:
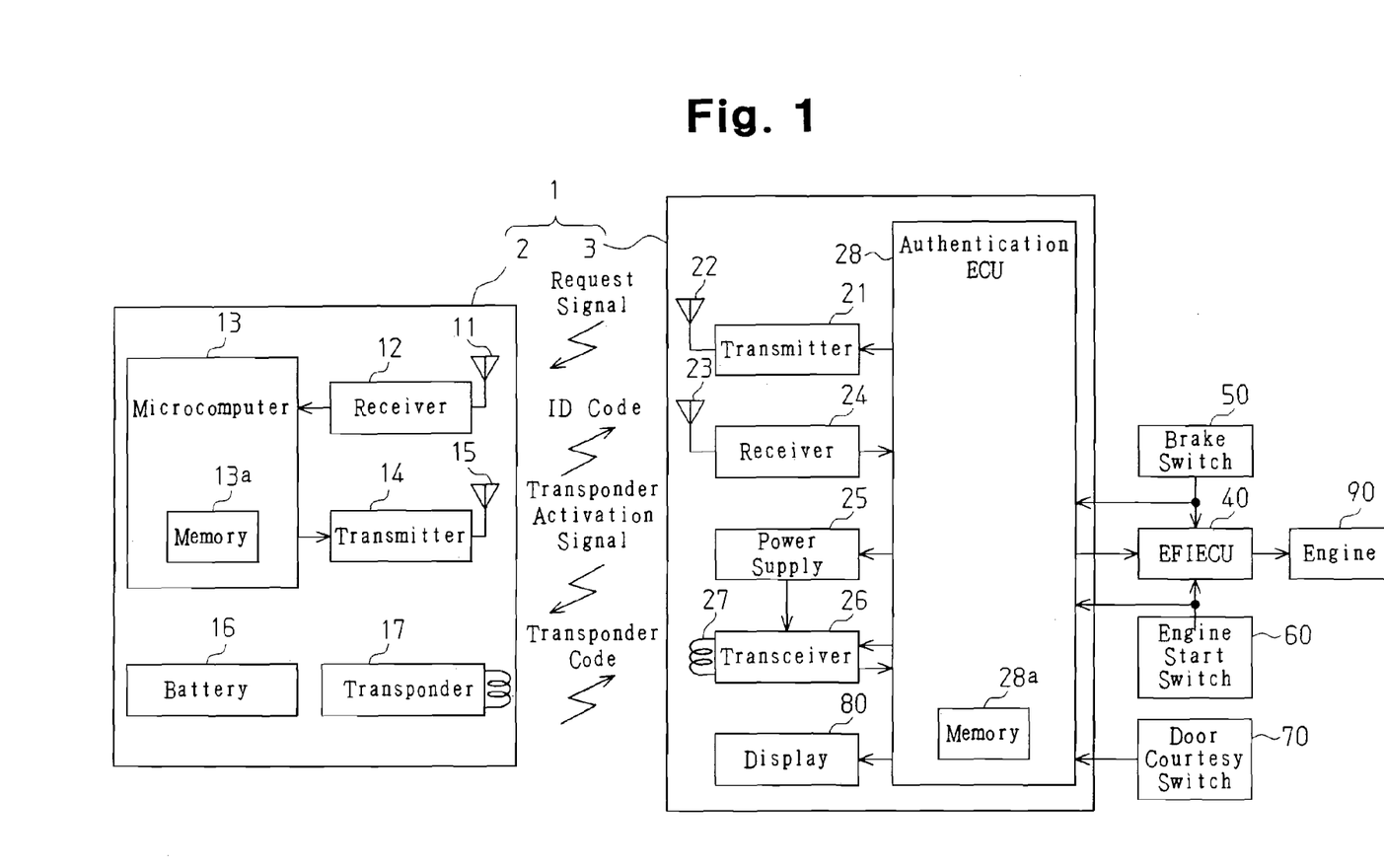
FIG. 1 is a block diagram showing an electronic key system.

Referring to FIG. 1, an electronic key system 1 includes a portable device 2 and an engine start controller 3. The portable device 2 is carried by a driver. The engine start controller 3 is installed in an automobile. In the electronic key system 1, bidirectional communication is performed between the portable device 2 and the engine start controller 3.

The portable device 2 is provided with a reception function and a transmission function. The portable device 2 includes a receiver antenna 11, a receiver circuit 12, a microcomputer 13, a transmitter circuit 14, a transmitter antenna 15, a battery 16, and a transponder 17. The receiver circuit 12 receives a request signal, which is transmitted from the engine start controller 3, via the receiver antenna 11. Upon receipt of the request signal from the engine start controller 3, the receiver circuit 12 demodulates the request signal to generate a reception signal and provides the reception signal to the microcomputer 13.

The microcomputer 13 includes a memory 13a in addition to a CPU, a ROM, and a RAM (not shown). The memory 13a stores an ID code that is unique to the portable device 2. When receiving the reception signal from the receiver circuit 12, the microcomputer 13 provides a signal including the ID code of the portable device to the transmitter circuit 14 in order to respond to the request signal.

The transmitter circuit 14 modulates the signal including the ID code of the portable device 2 to a signal having a predetermined frequency (in the preferred embodiment, 300 MHz) and transmits the modulated signal from the transmitter antenna 15. The battery 16 functions as a power supply for transmitting the signal including the ID code of the portable device 2 in response to the request signal. The battery 16 is a button cell battery (primary battery). The transponder 17 stores a transponder code that is unique to the transponder 17, or the portable device 2. In response to a transponder activation signal transmitted from the engine start controller 3, the transponder 17 generates electromotive force to transmit a signal including the transponder code with a predetermined frequency (in the preferred embodiment, 134 KHz).

The engine start controller 3 includes a transmitter circuit 21, a transmitter antenna 22, a receiver antenna 23, a receiver circuit 24, a power supply circuit 25, a transceiver circuit 26, a transceiver antenna 27, and an authentication ECU 28. The transmitter circuit 21 (first transmitter circuit) modulates the request signal provided from the authentication ECU 28 to a signal having a predetermined frequency (in the preferred embodiment, 134 KHz) and transmits the modulated signal from the transmitter antenna 22. The transmitter circuit 21 transmits the request signal to have the portable device 2 transmit the signal including the ID code of the portable device 2.

Figure 2:
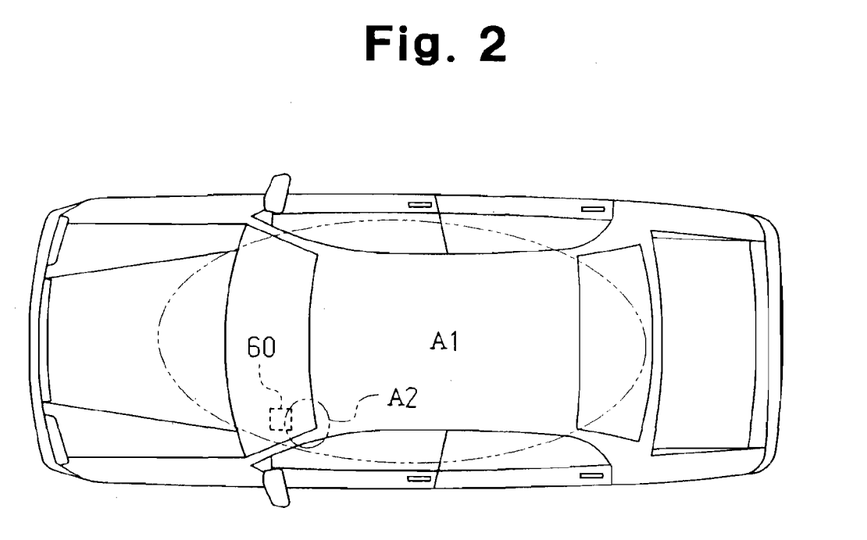
FIG. 2 is a schematic diagram showing a first range and a second range.

The transmitter antenna 22 is configured by a bar antenna arranged underneath the driver seat. The directivity of the transmitter antenna 22 and the output of the request signal are set so that the request signal is transmitted throughout the entire passenger compartment but does not leak out of the passenger compartment. In the preferred embodiment, the request signal is transmitted to a first range A1, which is shown by the broken line in FIG. 2. When the request signal is transmitted from the transmitter antenna 22, bidirectional communication is performed between the portable device 2 and the engine start controller 3 in the first range A1.

The receiver circuit 24 (first receiver circuit) receives the signal including the ID code of the portable device 2, which is transmitted by the portable device 2 in response to the request signal, via the receiver antenna 23. The receiver circuit 24 demodulates the signal including the ID code of the portable device 2 to generate a reception signal and provides the reception signal to the authentication ECU 28.

The transceiver circuit 26 uses the transponder activation signal provided from the authentication ECU 28 and the power supplied from the power supply circuit 25 to generate a transponder activation signal having a predetermined frequency (in the preferred embodiment, 134 KHz). The transceiver circuit 26 then transmits the transponder activation signal from the transceiver antenna 27 to have the portable device transmit a signal including the transponder code. Further, the transceiver circuit 26 functions as a second transmitter circuit and a second receiver circuit. The power supply circuit 25 supplies the transceiver circuit 26 with the power required to generate the transponder activation signal based on a power supply command signal from the authentication ECU 28.

The transceiver antenna 27 is a coil antenna arranged near an engine start switch 60, which is located near the driver seat. The directivity of the transceiver antenna 27 and the output of the transponder activation signal are set so that the transponder activation signal is transmitted to a small range that is in reach from the driver when seated on the driver seat. More specifically, the transponder activation signal is transmitted in a range extending between 20 to 50 mm from the engine start switch 60 towards the driver seat. The transponder activation signal is transmitted in a second range A2, which is shown in an exaggerated manner by broken lines in FIG. 2. When the transponder activation signal is transmitted from the transceiver antenna 27, bidirectional communication is performed between the portable device 2 and the engine start controller 3 in the second range A2.

The transceiver circuit 26 receives the signal including the transponder code, which is transmitted from the portable device 2 in response to the transponder activation signal, via the transceiver antenna 27. Upon receipt of the signal including the transponder code from the portable device 2, the transceiver circuit 26 demodulates the signal and generates a reception signal. The transceiver circuit 26 then provides the reception signal to the authentication ECU 28.

The authentication ECU 28 includes a memory 28a in addition to a CPU, a ROM, and a RAM. The memory 28a functions as a first storage circuit and stores an ID code (automobile ID code) that is identical to the ID code of the portable device 2. The memory 28a also functions as a second storage circuit and stores a transponder code (automobile transponder code) that is identical to the transponder code of the portable device 2.

To transmit the request signal in the first range A1, the authentication ECU 28 executes smart control and provides the request signal to the transmitter circuit 21. Further, to transmit the transponder activation signal in the second range A2, the transceiver circuit 26 executes immobilizer control and provides the transponder activation signal to the transceiver circuit 26. During the execution of the immobilizer control, the authentication ECU 28 provides the power supply command signal to the power supply circuit 25. The smart control and the immobilizer control are executed so that the request signal transmitted from the transmitter antenna 22 and the transponder activation signal transmitted from the transceiver antenna 27 do not interfere with one another in the passenger compartment. That is, the authentication ECU 28 does not output the request signal simultaneously with the transponder activation signal and the power supply signal.

When executing the smart control and receiving a reception signal including the ID code of the portable device 2 from the receiver circuit 24, the authentication ECU 28 determines whether or not the ID code of the portable device 2 matches the automobile ID code. That is, the authentication ECU 28 executes ID code authentication. Further, when executing the immobilizer control and receiving a reception signal including the transponder code of the portable device 2 from the transceiver circuit 26, the authentication ECU 28 determines whether or not the transponder code of the portable device 2 matches the automobile transponder code. That is, the authentication ECU 28 executes transponder code authentication.

An electronic fuel injection (EFI) ECU 40 is electrically connected to the authentication ECU 28. The authentication ECU 28 provides the EFI ECU 40 with an engine start enabling signal when the two ID codes match. In this case, the authentication ECU 28 functions as a first control unit executing a first control as an engine start enabling control. Further, when the two transponder codes match, the authentication ECU 28 provides the EFI ECU 40 with an engine start enabling signal. In this case, the authentication ECU 28 functions as a second control unit executing a second control as the engine start enabling control.

The EFI ECU 40 starts the engine 90, which functions as a control subject. The EFI ECU 40 is electrically connected to a brake switch 50 and the engine start switch 60.

The brake switch 50 detects operation of the brake. When a brake pedal (not shown) is depressed, the brake switch 50 accordingly provides the EFI ECU 40 with a detection signal during the period the brake pedal is depressed. The EFI ECU 40 determines whether the brake is being operated from the detection signal of the brake switch 50.

The engine start switch 60 is a push switch that has a button pushed by the driver. When the button is pushed, the engine start switch 60 accordingly provides the EFI ECU 40 with a detection signal during the period the button is pushed. The EFI ECU 40 determines whether the engine start switch 60 is being operated from the detection signal of the engine start switch 60.

When receiving the engine start enabling signal from the authentication ECU 28, if the EFI ECU 40 determines that the brake and engine start switch 60 are both being operated, the EFI ECU 40 starts the engine 90 with a starter motor (not shown).

A door courtesy switch 70 is electrically connected to the authentication ECU 28. When the automobile door is open, the door courtesy switch 70 accordingly provides the authentication ECU 28 with a detection signal during the period the door is open. When the door is closed, the door courtesy switch 70 accordingly provides the authentication ECU 28 with a detection signal during the period the door is closed. The authentication ECU 28 determines the state of the door based on the detection signal of the door courtesy switch 70.

The engine start controller 3 includes a display 80, which functions as an instruction device. The display 80 is electrically connected to the authentication ECU 28. A display used for a so-called car navigation system is used as the display 80. Information for starting the engine 90 is shown on the display 80.

The operation for starting the engine 90 will now be described with reference to the flowcharts of FIGS. 3 to 5.

Based on the detection signal of the door courtesy switch 70, when the authentication ECU 28 determines that the door is open (YES in S1), the authentication ECU 28 executes the smart control (S2). That is, when the door is open, the authentication ECU 28 provides the transmitter circuit 21 with the request signal to validate the smart ignition function. Then, the transmitter circuit 21 transmits the request signal from the transmitter antenna 22 to the first range A1, which covers the entire passenger compartment. As a result, bidirectional communication between the portable device 2 and the engine start controller 3 is enabled in the first range A1.

When the driver, who is carrying the portable device 2, enters the passenger compartment, or the first range A1, the portable device 2 transmits a signal including the ID code in response to the request signal. When receiving the signal via the receiver antenna 23, the receiver circuit 24 provides the authentication ECU 28 with a reception signal.

Then, the authentication ECU 28 performs ID code authentication (S3). More specifically, the authentication ECU 28 determines whether the ID code of the portable device 2 that is included in the reception signal from the receiver circuit 24 matches the automobile ID code stored in the memory 28a. When the two ID codes match (YES in S3), the authentication ECU 28 executes the first control (S4). More specifically, the authentication ECU 28 provides the engine start enabling signal to the EFI ECU 40 when the two ID codes match. If the brake and engine start switch 60 are both operated when the engine start enabling signal is provided from the authentication ECU 28 (YES in S5), the EFI ECU 40 starts the engine 90 with the starter motor (S6).

If the brake or the engine start switch 60 is not operated (NO in S5) even though the first control is being performed (S4), when a predetermined first period T1 elapses from the initiation of the first control (YES in S7) but a predetermined second period T2 has not yet elapsed (NO in S8), the authentication ECU 28 displays a first guide on the display 80 (S9). In this case, the smart ignition function is valid. However, there is a high possibility that the driver is not aware of the operation required to start the engine 90. Accordingly, the authentication ECU 28 displays the first guide on the display 80 to instruct the driver (user) of the operation required to start the engine 90. For example, the authentication ECU 28 displays the message "engine will start by pushing switch while depressing brake pedal" on the display 80 as the first guide.

If the first guide is displayed on the display 80 (S9) but the brake and engine start switch 60 are both not operated (NO in S5) and the second period T2 elapses from when the first guide is displayed (YES in S7 and YES in S8), the authentication ECU 28 proceeds to step S10. In step S10, the authentication ECU 28 stops displaying the first guide. Subsequently, the authentication ECU 28 disables the starting of the engine 90 (S11). In this case, there is a high possibility that the driver does not intend to start the engine 90. Thus, the authentication ECU 28 stops providing the EFI ECU 40 with the engine start enabling signal.

If the smart control is being executed (S2) but a reception signal including the ID code that matches the automobile ID code is not provided from the receiver circuit 24 (NO in S3) and a predetermined time T3 from initiation of the smart control elapses (YES in S21), the authentication ECU 28 proceeds to step S24. In this case, there is a high possibility that battery drainage has occurred in the portable device 2 carried by the driver who has entered the automobile. Further, there is a high possibility that the driver is not aware of the required operations when the smart ignition function is invalid due to battery drainage of the portable device 2.

The authentication ECU 28 also proceeds to step S24 if the ID code authentication is not performed in step S3 but the brake is operated (YES in S22) before the third period T3 from initiation of the smart control elapses (NO in S21). Further, the authentication ECU 28 proceeds to step S24 when the ID code authentication is not performed in step S3 but the engine start switch 60 is operated (YES in S23) before the third period T3 from initiation of the smart control elapses (NO in S21). In such cases, even though the smart ignition function is invalid due to battery drainage, there is a high possibility that the driver is not aware of the battery drainage and is performing operations assuming that the smart ignition function is valid.

In step S24, the authentication ECU 28 stops the smart control. Then, the authentication ECU 28 executes the immobilizer control (S25). The authentication ECU 28 invalidates the immobilizer function to enable the starting of the engine 90. More specifically, the authentication ECU 28 provides the power supply circuit 25 with the power supply command signal and the transceiver circuit 26 with the transponder activation signal. Then, the transceiver circuit 26 transmits the transponder activation signal to the second range A2, which covers the limited area near the engine start switch 60. As a result, bidirectional communication is enabled between the portable device 2 and the engine start controller 3 in the second range A2.

Subsequently, the authentication ECU 28 displays the second guide on the display 80 (S26). More specifically, when affirmative determinations are given in any one of steps S21 to S23, there is a high possibility that the driver is not aware of the operations required to start the engine 90 when the smart ignition function is invalid. Thus, the authentication ECU 28 displays the second guide on the display 80 to instruct the driver of the necessary operation. For example, the authentication ECU 28 displays the message "hold the portable device near the switch" on the display 80 as the second guide.

In this state, when the driver holds the portable device 2 in the second range A2 near the engine start switch 60, the portable device 2 transmits a signal including the transponder code in response to the transponder activation signal. The signal is then provided to the transceiver circuit 26 via the transceiver antenna 27. As a result, the transceiver circuit 26 provides the authentication ECU 28 with a reception signal.

The authentication ECU 28 then executes the transponder code authentication (S27). More specifically, the authentication ECU 28 determines whether the transponder code of the portable device included in the reception signal from the transceiver circuit 26 matches the automobile transponder code stored in the memory 28a. When determining that the two transponder codes match (YES in S27), the authentication ECU 28 stops displaying the second guide (S28). Then, the authentication ECU 28 executes the second control (S29). More specifically, when the two transponder codes match, the authentication ECU 28 provides the EFI ECU 40 with the engine start enabling signal. In a state in which the engine start enabling signal is being received from the authentication ECU 28, if the brake and engine start switch 60 are both operated, the EFI ECU 40 controls the starter motor to start the engine 90 (S31).

If the second guide is being displayed (S26) but a reception signal including a transponder code matching the automobile transponder code is not received (NO in S27), when a predetermined fourth period T4 elapses from when the second guide is displayed (YES in S32), the authentication ECU 28 proceeds to step S33. In step S33, the authentication ECU 28 stops displaying the second guide. Then, the authentication ECU 28 stops the immobilizer control (S34). In this case, there is a high possibility that the driver does not intend to start the engine 90. Accordingly, the authentication ECU 28 stops providing the power supply circuit 25 with the power supply command signal and stops providing the transceiver circuit 26 with the transponder activation signal.

If the brake or engine start switch 60 is not operated (NO in S30) even though the second control is being executed (S29), when a predetermined fifth period T5 elapses from the initiation of the second control but a predetermined sixth period T6 has not yet elapsed (NO in S42), the authentication ECU 28 displays a third guide on the display 80 (S43). In this case, there is a high possibility that the driver is not aware of the operations for invalidating the immobilizer function and starting the engine 90. Accordingly, the authentication ECU 28 displays the third guide on the display 80 to instruct the driver of the operation required to start the engine 90. For example, the authentication ECU 28 displays a message "engine will start by pushing switch while depressing brake pedal" on the display 80 as the third guide.

If the third guide is displayed on the display 80 (S43) but the brake and engine start switch 60 are both not operated (NO in S30) and the sixth period T2 elapses from when the third guide is displayed (YES in S41 and YES in S42), the authentication ECU 28 proceeds to step S44. In step S44, the authentication ECU 28 stops displaying the third guide. Subsequently, the authentication ECU 28 disables the starting of the engine 90 (S45). In this case, there is a high possibility that the driver does not intend to start the engine 90. Thus, the authentication ECU 28 stops providing the EFI ECU 40 with the engine start enabling signal.

The preferred embodiment has the advantages described below.

(1) When the transmitter circuit 21 is transmitting the request signal but the receiver circuit 24 does not receive a signal including an ID code matching the ID code stored in the memory 28a, the authentication ECU 28 displays the procedure for starting the engine 90 (S26) through execution of the second control (transponder code authentication). More specifically, when bidirectional communication cannot be performed between the portable device 2 and the engine start controller 3 in the first range A1, the authentication ECU 28 cannot enable the starting of the engine 90 through the first control (ID code authentication). Thus, the authentication ECU 28 displays the operation that is necessary in this state on the display 80. This enables the driver to perform the operation that is necessary when bidirectional communication is not performed between the portable device 2 and the engine start controller 3 in the first range A1.

(2) When the smart ignition function is invalid due to battery drainage in the portable device 2, the authentication ECU 28 instructs the user of the operation that invalidates the immobilizer function and starts the engine 90, or displays the second guide on the display 80. Thus, even if the driver forgets such operation, the driver will hold the portable device 2 near the engine start switch 60 without any confusion by looking at the message on the display 80. This ensures that the driver will be able to perform the operation for invalidating the immobilizer function that would be unnecessary if the smart ignition function were valid.

(3) If the receiver circuit 24 does not receive a signal including an ID code matching the ID code stored in the memory 28a even though the transmitter circuit 21 is transmitting the request signal and the third period T3 from when transmission of the request signal is initiated elapses, the display 80 displays the second guide to instruct the driver of the operation necessary for enabling the starting of the engine 90. Accordingly, the display 80 displays the message at an appropriate timing. That is, the second guide is displayed only when necessary. This reduces the power consumed to display the second guide.

(4) When the driver performs operations assuming that the starting of the engine 90 has been enabled through the first control (ID code authentication) even though the authentication ECU 28 has not enabled the starting of the engine 90, the display 80 displays the instruction for having the driver perform the operation necessary to enable the starting of the engine 90. In this case, the possibility of the driver being aware that bidirectional communication between the portable device 2 and the engine start controller 3 in the first range A1 is low. Further, there is a high possibility that the driver does not know the operation required to enable the starting of the engine. Thus, the display 80 displays a message, at an appropriate timing, for instructing the driver of the operation required to enable the starting of the engine 90. The message enables the driver to perform the required operation when bidirectional communication between the portable device 2 and the engine start controller 3 is not performed in the first range A1.

(5) Battery drainage of the portable device 2 seldom occurs. Thus, even if battery drainage occurs in the portable device 2, the driver tries to start the engine 90 as if he or she usually does assuming that battery drainage has not occurred and that the smart ignition function is valid. More specifically, there is a high possibility of the driver operating the brake and engine start switch 60 even though the smart ignition function is invalid due to battery drainage. Thus, in the preferred embodiment, if the brake or engine start switch 60 are operated even though the smart ignition function is invalid, the authentication ECU 28 determines that such operation has been performed since the driver is not aware of the battery drainage. Accordingly, the driver displays the second guide on the display 80. As a result, the driver becomes aware of the battery drainage in the portable device by looking at the display and is informed that the portable device 2 should be held near the engine start switch 60.

(6) The display 80 displays the second guide during the period in which the transceiver circuit 26 transmits the transponder activation signal. That is, when bidirectional communication is not performed between the portable device 2 and the engine start controller 3 in the first range A1, the display 80 displays the second guide during the period in which the driver can perform the operation required to enable engine starting. Thus, the second guide is not displayed when unnecessary. This reduces the power consumed to display the second guide.

(7) The display 80 stops displaying the second guide when a predetermined time elapses (fourth period T4) measured from when the second guide is displayed. Thus, the display 80 does not continuously display the second guide in an unnecessary manner. This reduces the power consumed to display the second guide.

(8) In addition to the second guide, the display 80 displays the first guide and the third guide. Thus, if the driver is not accustomed to driving an automobile provided with a one-push type smart ignition function, the driver can start the engine 90 without any confusion by following the guide.

(9) The display 80 stops displaying the first guide when a predetermined time (second period T2) elapses from when the first guide is displayed. Further, the display 80 stops displaying the third guide when a predetermined time (sixth period T6) elapses from when the third guide is displayed. This reduces the power consumed to display the guides.

It should be apparent to those skilled in the art that the present invention may be embodied in many other specific forms without departing from the spirit or scope of the invention. Particularly, it should be understood that the present invention may be embodied in the following forms.

The display 80 may display the message "depress the brake and push the switch while holding the portable device near the switch" as the second guide.

The display 80 may display the message "refer to page X of manual" as the second guide.

The display 80 may display the message "refer to caution label on rear side of sun visor" as the second guide.

The display 80 may display the message "replace battery (type: AB1234)" as the second guide.

The display 80 may sequentially display the procedures that become necessary when the smart ignition function is invalid such as "push menu button of car navigation system to . . . " as the second guide.

Figure 3:
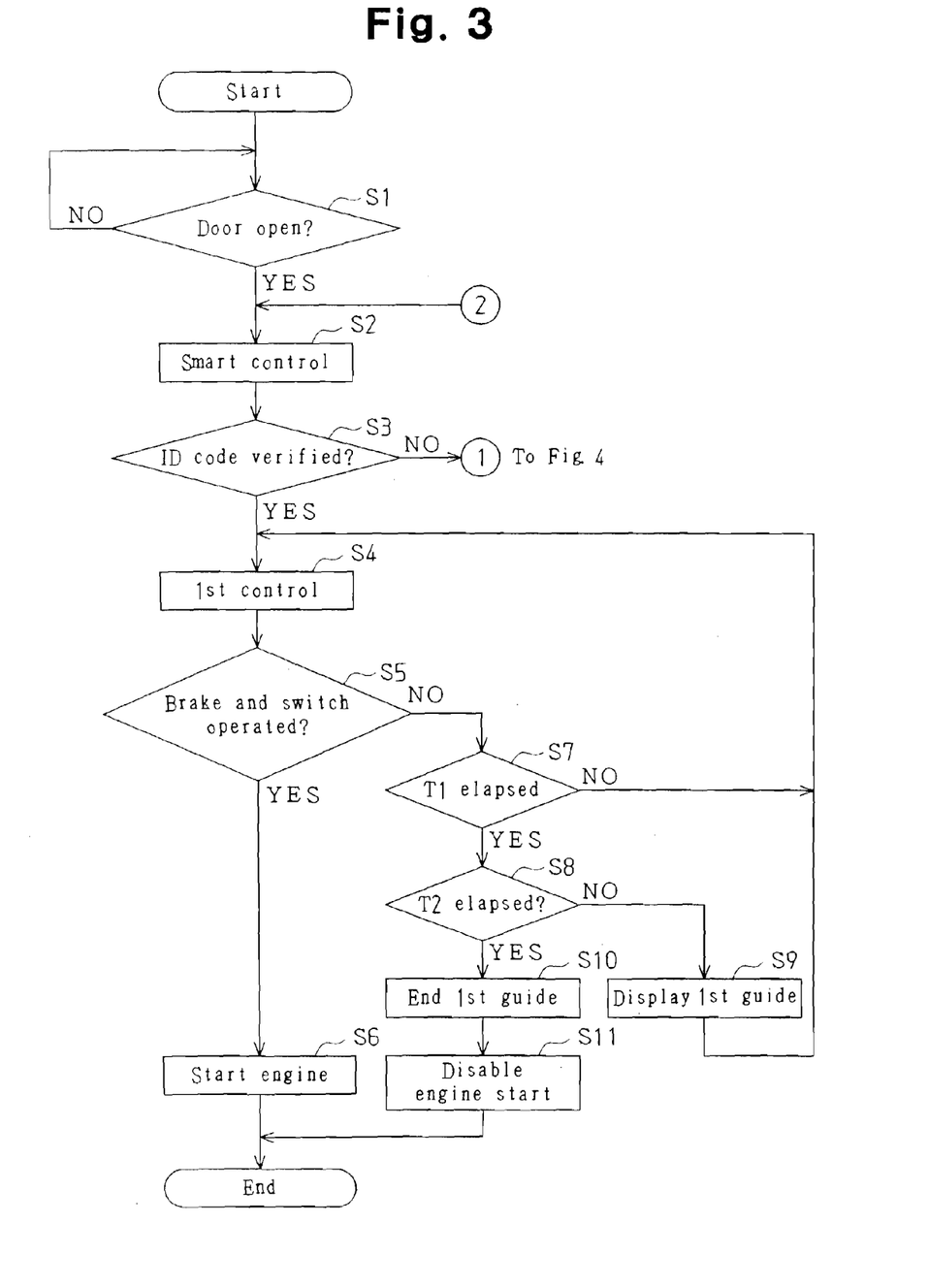
FIG. 3 is a flowchart showing the operation for starting the engine.

After performing step S11 of FIG. 3, the authentication ECU 28 may display the message "open door to start engine" as a fourth guide on the display 80. Further, the authentication ECU 28 may stop displaying the fourth guide if a predetermined time (seventh period T7) elapses from when the fourth guide is displayed. Alternatively, the authentication ECU 28 may stop displaying the fourth guide if the door is opened. As another option, after displaying the fourth guide, the authentication ECU 28 may stop displaying the fourth guide when a predetermined time (seventh period T7) elapses or when the door is opened, whichever occurs earlier.

Figure 4:
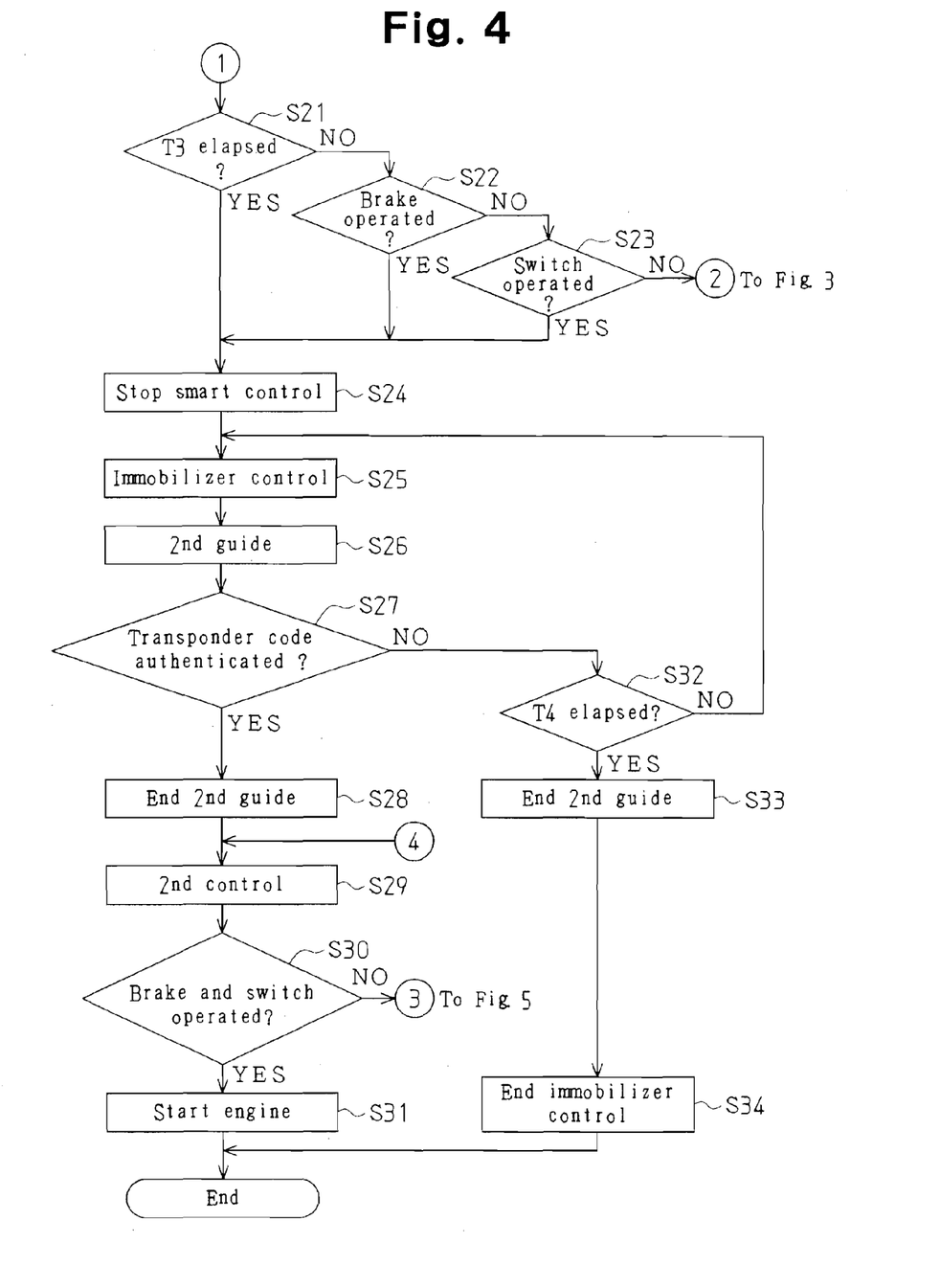
FIG. 4 is a flowchart showing the operation for starting the engine.

After performing step S34 of FIG. 4, the authentication ECU 28 may display the message "open door to start engine" as a fifth guide on the display 80. Further, the authentication ECU 28 may stop displaying the fifth guide if a predetermined time (eighth period T8) elapses from when the fifth guide is displayed. Alternatively, the authentication ECU 28 may stop displaying the fifth guide if the door is opened. As another option, after displaying the fifth guide, the authentication ECU 28 may stop displaying the fifth guide when the predetermined time (eighth period T8) elapses or when the door is opened, whichever occurs earlier.

Figure 5:
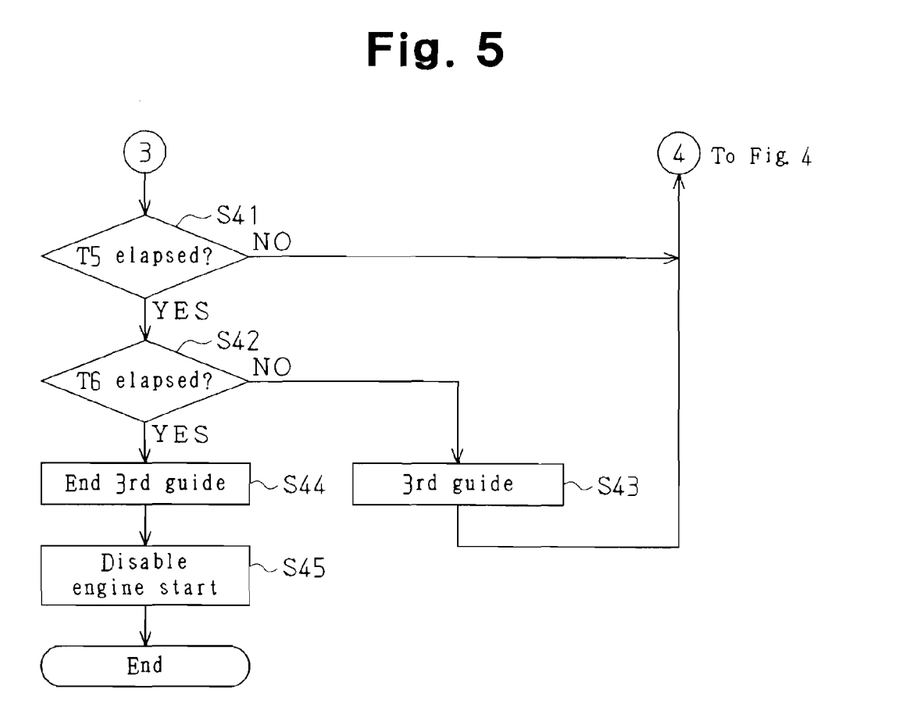
FIG. 5 is a flowchart showing the operation for starting the engine.

After performing step S45 of FIG. 5, the authentication ECU 28 may display the message "open door to start engine" as a sixth guide on the display 80. Further, the authentication ECU 28 may stop displaying the sixth guide if a predetermined time (ninth period T9) elapses from when the sixth guide is displayed. Alternatively, the authentication ECU 28 may stop displaying the sixth guide if the door is opened. As another option, after displaying the sixth guide, the authentication ECU 28 may stop displaying the sixth guide when the predetermined time (eighth period T9) elapses or when the door is opened, whichever occurs earlier.

In addition to or in lieu of the first to sixth guide, which are messages including words, the authentication ECU 28 may use symbols or pictures to display information relating to the operations for starting the engine 90 on the display 80.

A rotary switch may be used instead of the push switch as the engine start switch 60. In this case, the authentication ECU 28 may display the message "turn knob while depressing the brake to start engine" as the first guide. Further, in this case, the display 80 may display a message such as "insert portable device in knob" as the second guide. The display 80 may also display a message such as "depress brake and turn knob to start engine."

The messages of the first to sixth guides may be displayed on a display arranged in an instrument panel instead of a display of a car navigation system.

In addition to or instead of displaying the information for starting the engine 90, the voice function of a car navigation system may be used to generate audio instructions for instructing a driver of the operations for starting the engine.

The present examples and embodiments are to be considered as illustrative and not restrictive, and the invention is not to be limited to the details given herein, but may be modified within the scope and equivalence of the appended claims.

What is claimed is:

1. A controller for an electronic key system including a portable device, carried by a user, and a control subject, the portable device incorporating a transponder and generating a signal including an ID code unique to the portable device and a signal including a transponder code unique to the transponder, the controller comprising:

a first storage circuit for storing an ID code identical to the ID code of the portable device;

a first transmitter circuit for transmitting a request signal that causes the portable device to transmit the signal including the ID code;

a first receiver circuit for receiving the signal including the ID code that is transmitted from the portable device in response to the request signal;

a first control unit for determining whether the ID code stored in the first storage circuit matches the ID code of the portable device and for performing a first control that enables activation of the control subject when the two ID codes match;

a second storage circuit for storing a transponder code identical to the transponder code of the portable device;

a second transmitter circuit for transmitting a transponder activation signal that causes the portable device to transmit the signal including the transponder code;

a second receiver circuit for receiving the signal including the transponder code that is transmitted from the portable device in response to the transponder activation signal;

a second control unit for determining whether the transponder code stored in the second storage circuit matches the transponder code of the portable device and for performing a second control that enables activation of the control subject when the two transponder codes match; and an instruction device for instructing the user of an operation that must be performed to have the second control unit enable activation of the control subject when the first receiver circuit does not receive the signal including the ID code from the portable device even though the first transmitter circuit is transmitting the request signal.

2. The controller according to claim 1, wherein the instruction device instructs the user of the operation that must be performed to have the second control unit enable activation of the control subject if a predetermined period elapses from when the first transmitter circuit starts to transmit the request signal without the first receiver circuit receiving the signal including the ID code that matches the ID code stored in the first storage circuit even though the first transmitter circuit is transmitting the request signal.

3. The controller according to claim 1, wherein the instruction device instructs the user of the operation that must be performed to have the second control unit enable activation of the control subject when the user performs an operation for activating the control subject even though the first control unit is not enabling activation of the control subject.

4. The controller according to claim 1, wherein the instruction device instructs the user of the operation that must be performed to have the second control unit enable activation of the control subject during a period in which the second transmitter circuit transmits the transponder activation signal.

5. The controller according to claim 1, wherein the instruction device stops instructing the user of the operation that must be performed to have the second control unit enable activation of the control subject if a predetermined period elapses from when the instruction is started.

6. A controller for an electronic key system including a portable device, carried by a user, and an engine, the portable device incorporating a transponder and generating a signal including an ID code unique to the portable device and a signal including a transponder code unique to the transponder, the controller comprising:

a first memory for storing an ID code identical to the ID code of the portable device;

a first transmitter circuit for transmitting a request signal that causes the portable device to transmit the signal including the ID code;

a first receiver circuit for receiving the signal including the ID code that is transmitted from the portable device in response to the request signal;

a second memory for storing a transponder code identical to the transponder code of the portable device;

a second transmitter circuit for transmitting a transponder activation signal that causes the portable device to transmit the signal including the transponder code;

a second receiver circuit for receiving the signal including the transponder code that is transmitted from the portable device in response to the transponder activation signal;

a control unit for performing ID code authentication to determine whether the ID code stored in the first memory matches the ID code of the portable device and enabling activation of the engine when the two ID codes match, and for performing transponder code authentication to determine whether the transponder code stored in the second memory matches the transponder code of the portable device and enabling activation of the engine when the two transponder codes match; and an instruction device for instructing the user of an operation that must be performed to have the control unit execute the transponder code authentication and enable activation of the engine when the first receiver circuit does not receive the signal including the ID code from the portable device even though the first transmitter circuit is transmitting the request signal.

7. The controller according to claim 6, wherein the instruction device instructs the user of the operation that must be performed to have the control unit execute the transponder code authentication and enable activation of the engine if a predetermined period elapses from when the first transmitter circuit starts to transmit the request signal without the first receiver circuit receiving the signal including the ID code that matches the ID code stored in the first memory even though the first transmitter circuit is transmitting the request signal.

8. The controller according to claim 6, wherein the instruction device instructs the user of the operation that must be performed to have the control unit execute the transponder code authentication and enable activation of the engine when the user performs an operation for activating the engine even though the control unit is executing the ID code authentication but not enabling activation of the engine.

9. The controller according to claim 6, wherein the instruction device instructs the user of the operation that must be performed to have the control unit execute the transponder code authentication and enable activation of the engine during a period in which the second transmitter circuit transmits the transponder activation signal.

10. The controller according to claim 6, wherein the instruction device stops instructing the user of the operation that must be performed to have the control unit execute the transponder code authentication and enable activation of the engine if a predetermined period elapses from when the instruction is started.

11. The controller according to claim 6, wherein the instruction device is a display for displaying the operation that must be performed by the user to have the control unit execute the transponder code authentication and enable activation of the engine.

12. The controller according to claim 6, wherein the instruction device uses an audio instruction to provide instruction for the operation that must be performed by the user to have the control unit execute the transponder code authentication and enable activation of the engine.

13. A method for controlling an electronic key system including a portable device, carried by a user and incorporating a transponder, and an engine, the method comprising the steps of:

generating a signal including an ID code unique to the portable device and a signal including a transponder code unique to the transponder;

storing an ID code identical to the ID code of the portable device;

transmitting a request signal that causes the portable device to transmit the signal including the ID code;

receiving the signal including the ID code that is transmitted from the portable device in response to the request signal;

performing ID code authentication to determine whether the stored ID code matches the ID code of the portable device and enabling activation of the engine when the two ID codes match;

storing a transponder code identical to the transponder code of the portable device;

transmitting a transponder activation signal that causes the portable device to transmit the signal including the transponder code;

receiving the signal including the transponder code that is transmitted from the portable device in response to the transponder activation signal;

performing transponder code authentication to determine whether the transponder code stored in the second memory matches the transponder code of the portable device and enabling activation of the engine when the two transponder codes match; and instructing the user of an operation that must be performed to start the step for performing transponder code authentication when activation of the engine is not enabled even though the step for transmitting a request signal and the step for performing ID code authentication are executed.

14. The method according to claim 13, wherein the step for instructing the user includes instructing the user of the operation that must be performed to start the step for performing transponder code authentication if a predetermined time elapses from when the step for transmitting a request signal starts in a state in which activation of the engine is not enabled even though the step for transmitting a request signal and the step for performing ID code authentication are executed.

15. The method according to claim 13, wherein the step for instructing the user includes instructing the user of the operation that must be performed to start the step for performing transponder code authentication if the user performs an operation for activating the engine in a state in which activation of the engine is not enabled even though the step for transmitting a request signal and the step for performing ID code authentication are executed.

16. The method according to claim 13, wherein the step for instructing the user includes instructing the user of the operation that must be performed to start the step for performing transponder code authentication during a period in which the step for transmitting a transponder activation signal is executed.

17. The method according to claim 13, wherein the step for instructing the user includes stopping instruction of the user of the operation that must be performed to start the step for performing transponder code authentication if a predetermined period elapses from when the step for instructing the user is started.

18. The method according to claim 13, wherein the step for instructing the user includes displaying the operation that must be performed by the user to start the step for performing transponder code authentication and enable activation of the engine.

19. The method according to claim 13, wherein the step for instructing the user includes using an audio instruction to provide instruction of the operation that must be performed by the user to start the step for performing transponder code authentication and enable activation of the engine.

* * * * *